(12) United States Patent  
Slater

(10) Patent No.: US 8,920,634 B2  
(45) Date of Patent: Dec. 30, 2014

(54) E-BEAM TREATMENT TO INCREASE CETANE

(75) Inventor: Peter N. Slater, Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 331 days.

(21) Appl. No.: 13/517,771

(22) Filed: Jun. 14, 2012

(65) Prior Publication Data  
US 2012/0318715 A1 Dec. 20, 2012

Related U.S. Application Data

(60) Provisional application No. 61/496,641, filed on Jun. 14, 2011.

(51) Int. Cl.  
C10G 35/00 (2006.01)

(52) U.S. Cl.  
USPC .......................................... 208/133; 208/106

(58) Field of Classification Search  
CPC ................ C10G 2300/805; C10G 2300/1051; C10G 2300/1055; C10G 2300/1096; C10G 9/24; C10G 15/08; C10G 55/04; C10G 65/12; C10G 69/06  
USPC .................................. 208/133, 106; 422/162  
See application file for complete search history.

(56) References Cited

U.S. PATENT DOCUMENTS

2007/0284285 A1* 12/2007 Stepanik et al. ............... 208/106  
2012/0297665 A1* 11/2012 Goerz, Jr. ......................... 44/301

* cited by examiner

Primary Examiner — Randy Boyer  
Assistant Examiner — Juan Valencia  
(74) Attorney, Agent, or Firm — Phillips 66 Company

(57) ABSTRACT

Methods and systems relate to treating an oil-in-water emulsion with an electron beam to decrease aromatic content therein for subsequent recovery of diesel products with upgraded cetane number. The method includes passing the emulsion formed of water and a hydrocarbon stream, such as light cycle oil, through an electron beam. The electron beam causes radiolysis of the water into intermediates that react with and open rings of aromatic compounds from the hydrocarbon stream. Separation of the water from the emulsion after the treating with the electron beam provides the diesel products, which may be hydroprocessed to remove oxygenates.

13 Claims, 2 Drawing Sheets

E-BEAM TREATMENT TO INCREASE CETANE

CROSS-REFERENCE TO RELATED APPLICATIONS

This application claims the benefit of U.S. Provisional Application No. 61/496,641, filed on Jun. 14, 2011. The entire disclosure of the above application is incorporated herein by reference.

STATEMENT REGARDING FEDERALLY SPONSORED RESEARCH OR DEVELOPMENT

None.

FIELD OF THE INVENTION

Embodiments of the invention relate to electron beam treatment of an aqueous emulsion containing hydrocarbons that have aromatic content reduced by the treatment.

BACKGROUND OF THE INVENTION

Refineries rely on catalytic cracking processes, such as fluid catalytic cracking (FCC), to convert relative heavy fractions of crude oil into more valuable fuels including gasoline and diesel. Light cycle oil (LCO) output from the FCC process boils in a range suitable for inclusion in the diesel blending pool. However, the LCO contains substantial aromatic content that may be at least 80% resulting in the LCO providing too low of a cetane number for diesel use.

Since the cetane number correlates inversely with the aromatic content, LCO upgrading approaches thus often attempt to reduce the aromatic content. Prior exemplary techniques to convert the LCO utilize hydrodearomatization (HAD) and hydrocracking. Both of these processes provide limited economic benefits due to capital expenses, amount of hydrogen consumed and required operating pressures.

Therefore, a need exists for cost efficient processes that enable increasing cetane number of hydrocarbon streams through reduction of aromatic content therein.

BRIEF SUMMARY OF THE DISCLOSURE

For one embodiment, a method of upgrading a refinery intermediate fluid includes adding water to a hydrocarbon stream to form an emulsion and treating the emulsion with an electron beam causing radiolysis of the water into intermediates that react with and open rings of aromatic compounds. The aromatic compounds make up at least 50% by weight of the hydrocarbon stream, which is mixed with the water to form the emulsion that is greater than 75% water by volume. Separating the water from the emulsion after the treating with the electron beam provides a diesel range product that has a higher cetane number than the hydrocarbon stream and is blended into a diesel fuel pool.

According to one embodiment, a method of upgrading a refinery intermediate fluid includes passing an emulsion of water and light cycle oil from a catalytic cracking unit through an electron beam. Based on composition of the emulsion, resulting reactions yield more ring opening of aromatic compounds than cracking of the light cycle oil. The method thereby upgrades cetane number of the light cycle oil for diesel blending.

In one embodiment, a system for upgrading a refinery intermediate fluid includes a catalytic cracking unit having an effluent of light cycle oil containing aromatic compounds. The system further includes a water source coupled to mix water with the light cycle oil to form an emulsion stream and an electron beam unit disposed to treat the emulsion by radiolysis of the water into intermediates that react with and open rings of the aromatic compounds. A separator couples to receive the emulsion output from the electron beam unit and remove the water from a diesel range product stream.

BRIEF DESCRIPTION OF THE DRAWINGS

A more complete understanding of embodiments of the invention and benefits thereof may be acquired by referring to the follow description taken in conjunction with the accompanying drawings in which.

DETAILED DESCRIPTION

Turning now to the detailed description for embodiments of the invention, it should be understood that the inventive features and concepts may be manifested in other arrangements and that the scope of the invention is not limited to the embodiments described or illustrated. The scope of the invention is intended only to be limited by the scope of the claims that follow.

Methods and systems relate to treating an oil-in-water emulsion with an electron beam to decrease aromatic content therein for subsequent recovery of diesel products with upgraded cetane number. The method includes passing the emulsion formed of water and a hydrocarbon stream, such as light cycle oil, through an electron beam. The electron beam causes radiolysis of the water into intermediates that react with and open rings of aromatic compounds from the hydrocarbon stream. Separation of the water from the emulsion after the treating with the electron beam provides the diesel products, which may be hydroprocessed to remove oxygenates.

As used herein, light cycle oil (LCO) refers to a hydrocarbon stream having an aromatic content of at least 50% by weight, at least 75% by weight or at least 80% by weight. In some embodiments, a catalytic cracking unit, such as a fluid catalytic cracking (FCC) process, outputs the LCO. The LCO for some embodiments boils in a range of 182° C. to 316° C. and has an initial cetane number below 20 or below 10. For example, aromatic compounds may make up at least 80% by weight of the LCO with paraffin, olefin and naphthenic compounds making up at least 15% by weight of the LCO. While described with particular reference to LCO, upgrading approaches described herein may be applicable to other hydrocarbon streams with similar properties even if not otherwise known as LCO.

Figure 1:
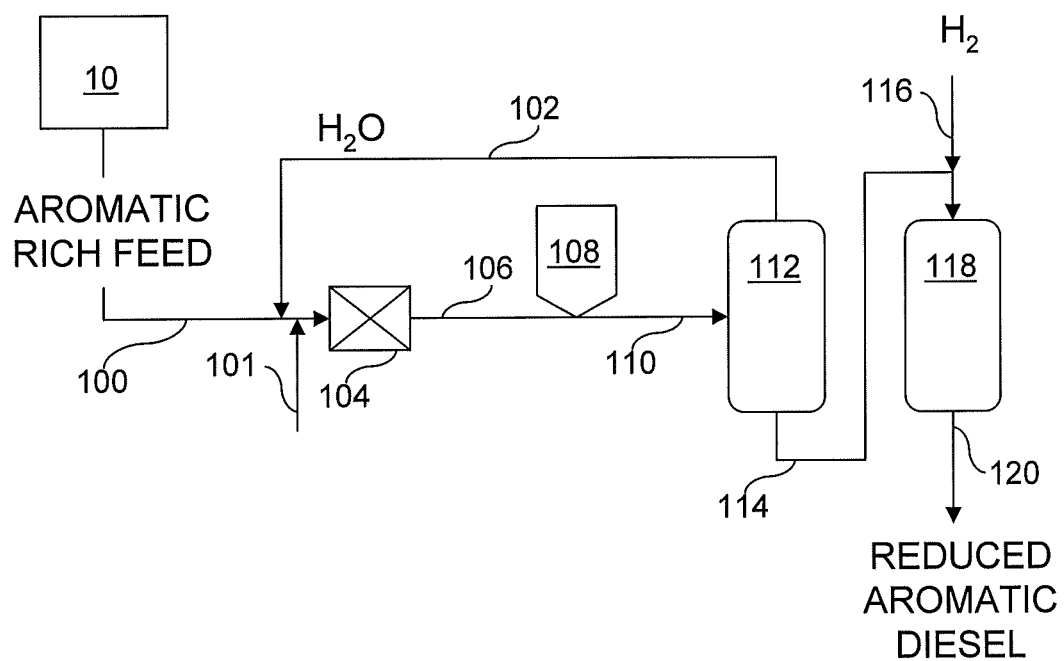
FIG. 1 shows a schematic e-beam treatment system for converting an aromatic-rich feed to an aromatic-lean diesel output, according to one embodiment.

FIG. 1 shows a schematic e-beam treatment system that enables converting a hydrocarbon stream 100 that is aromatic-rich to a diesel range product 120 that is aromatic-lean relative to the hydrocarbon stream 100. Such conversion therefore yields the diesel range product 120 with a higher cetane number than the hydrocarbon stream 100. For some embodiments, compounds with a carbon count between 10 and 25 make up at least 90% by weight of both the hydrocarbon stream 100 and the diesel range product 120. The diesel range product 120 provides a suitable blend stock for the diesel pool at the refinery.

The treatment system includes a mixer 104, an electron beam unit 108, a separator 112 and a hydroprocessing unit 118. In operation, the mixer 104 receives the hydrocarbon stream 100 (e.g., LCO from a FCC unit 10) along with water 102 from a recycle loop or other water source. The mixer 104 facilitates forming an untreated emulsion 106 of the hydrocarbon stream 100 and the water 102 to ensure sufficient dispersion and contact among phases upon subsequent treatment in the electron beam unit 108.

For example, a fixed element disposed in a flow path through a pipe may form the mixer 104 and provide static mixing of the hydrocarbon stream 100 and the water 102. Introducing an optional chemical emulsifying agent 101 may promote stability of the untreated emulsion 106 throughout residence in the electron beam unit 108. An injection line conveys the emulsifying agent 101 into the hydrocarbon stream 100.

The untreated emulsion 106 then passes through an electron beam of the electron beam unit 108 and exits as a treated emulsion 110. The electron beam unit 108 causes radiolysis of the water in the untreated emulsion 106 to produce reactive intermediates including oxidizing hydroxyl radicals (.OH), reducing aqueous electrons ($e^-_{aq}$) and hydrogen radicals (.H). The reactive intermediates from the radiolysis of the water diffuse throughout the untreated emulsion 106 and interact with and transfer energy to the hydrocarbons.

While not limited to any theory, the hydroxyl radicals in particular attack the hydrocarbons due to reactivity with aromatic compounds of the untreated emulsion 106. Attack and resulting addition of the hydroxyl radicals opens at least some rings (e.g., a benzene ring substituent) of the aromatic compounds from the hydrocarbon stream 100 in order to form the treated emulsion 110. For polycyclic aromatic compounds, opening any number of the rings provides a benefit for increasing the cetane number.

Abundance of the water 102 relative to the hydrocarbon stream 100 in the untreated emulsion 106 limits polymerization reactions of the hydrocarbons passing through the electron beam unit 108 or cracking of the hydrocarbons into separate molecules upon passing through the electron beam unit 108. For some embodiments, flow rates for the hydrocarbon stream 100 and the water 102 make the untreated emulsion 106 greater than 75% water by volume, at least 85% water by volume or at least 95% water by volume. Reaction with the reactive intermediates from radiolysis of the water yields more ring opening of the aromatic compounds than cracking/polymerization. Further, less than 5% by weight of the hydrocarbon stream 100 may crack during the treating with the electron beam unit 108.

In some embodiments, the electron beam unit 108 produces the electron beam having energy between 1.0 and 1.5 mega-electron volts (MeV). Design considerations for a chamber in which the untreated emulsion 106 is exposed to the electron beam account for factors such as penetration depth and width of the electron beam along with volumetric flow rate of the untreated emulsion 106. Some embodiments may use multiple parallel accelerators within the electron beam unit 108 to give desired energy absorption dose to the untreated emulsion 106.

The untreated emulsion 106 may pass through the electron beam unit 108 at ambient conditions without requiring additional temperature or pressure modifications for some embodiments. The reactions described herein for opening of the rings proceed at temperatures and pressures below those required for processes such as hydrodearomatization or hydrocracking. By example, the conditions employed with the electron beam unit 108 may include temperatures between 10° C. and 100° C. and pressures between 100 kilopascal (kPa) and 1000 kPa.

After processing to convert the untreated emulsion 106 into the treated emulsion 110 using the electron beam unit 108, the treated emulsion 110 feeds to the separator 112. The separator 112 divides the water 102 within the treated emulsion 110 from an intermediate oxygenated stream 114 within the treated emulsion 110. The water 102 recovered in the separator 112 may recycle back in a continuous loop for mixing with more of the hydrocarbon stream 100.

Hydrogen 116 along with the intermediate oxygenated stream 114 enter the hydroprocessing unit 118 to remove oxygenates from the intermediate oxygenated stream 114 and produce the diesel range product 120. A reactor packed with appropriate hydrotreating catalyst forms the hydroprocessing unit 118. Removing the oxygen in the hydroprocessing unit 118 requires milder operating conditions and less supply of the hydrogen 116 than routes, based on hydrodearomatization or hydrocracking, which do not accomplish the ring opening by oxidation.

Figure 2:
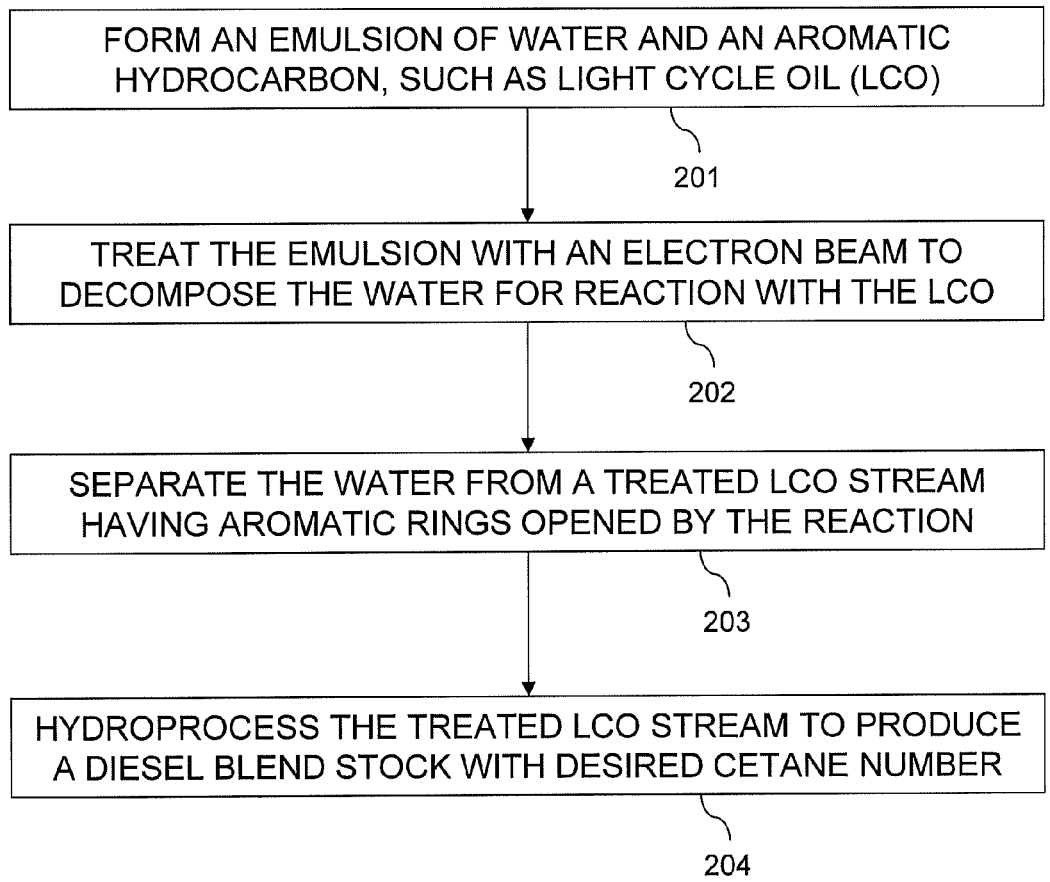
FIG. 2 illustrates a flow chart of a method for such upgrading, according to one embodiment.

FIG. 2 illustrates a flow chart of an upgrading method such as described herein with respect to the system shown in FIG. 1. The method includes a mixing step 201 where an emulsion of water and an aromatic hydrocarbon is formed. In some embodiments, LCO provides the aromatic hydrocarbon. Treating the emulsion with an electron beam causes radiolysis of the water for reaction of resulting intermediates with the LCO in a ring opening step 202. Next, a water recovery step 203 separates the water from a treated LCO stream that has aromatic rings opened as a result of the reaction during the ring opening step 202. In an oxygenate removal step 204, hydroprocessing the treated LCO stream removes oxygenates and produces a diesel blend stock, which has a desired cetane number higher than an initial cetane number of the LCO prior to treatment.

Thus, a method in accordance with the present teachings may include adding water to a hydrocarbon stream to form an emulsion. Aromatic compounds within the emulsion may make up at least 50% by weight of the hydrocarbon stream, and the emulsion may be greater than 75% water by volume. The process may also involve treating the emulsion with an electron beam and thereby causing radiolysis of the water into intermediates that react with and open rings of the aromatic compounds. A ring that may open may include a benzene ring substituent; regardless, some rings of the aromatic compounds from the hydrocarbon stream 100 may be opened in order to form the treated emulsion 110. The method may also involve separating the water from the emulsion after treating with the electron beam to provide a diesel range (i.e. diesel fuel) product.

The method may also involve blending the diesel range product having a higher cetane number than the hydrocarbon stream into a diesel fuel pool. The method may also involve outputting hydrocarbon stream 100 from catalytic cracking unit 10. The method may also involve recovering a hydrocarbon stream of light cycle oil from fluid catalytic cracking. The method may also involve cracking less than 5% by weight of the hydrocarbon stream during the treating with the electron beam. The method may also involve hydroprocessing the diesel range product to remove oxygenates. As part of a method in accordance with the present teachings, the aromatic compounds may make up at least 75% by weight of the hydrocarbon stream. As part of a method in accordance with the present teachings, the aromatic compounds may make up at least 80% by weight of the hydrocarbon stream. As part of a method in accordance with the present teachings, paraffin, olefin and naphthenic compounds may make up at least 15% by weight of the hydrocarbon stream.

As part of a method in accordance with the present teachings, compounds with a carbon count between 10 and 25 may make up at least 90% by weight of both the hydrocarbon stream and the diesel range product. As part of a method in accordance with the present teachings, the emulsion may be at least 85% water by volume. As part of a method in accordance with the present teachings, the emulsion may be at least 95% water by volume. The method may also involve further adding an emulsifying agent to the water and the hydrocarbon stream to facilitate forming the emulsion.

In another example of the present teachings, a method may include passing an emulsion of water and light cycle oil from a catalytic cracking unit through an electron beam. Resulting reactions based on composition of the emulsion may yield more ring opening(s) of aromatic compounds than cracking of the light cycle oil in order to upgrade a cetane number of the light cycle oil for diesel blending. The emulsion may be greater than 75% water by volume.

The teachings of the present disclosure may also include an apparatus or structural system of components such that each component performs a function, and together the components transform a beginning product, such as a hydrocarbon stream, into a different product, such as diesel fuel. Moreover, such a system of structural components, as depicted in FIG. 1, may be employed to perform the methods described above. Accordingly, structural components may include catalytic cracking unit 10 that provides fluid catalytic cracking. Catalytic cracking unit 10 may also possess an effluent of light cycle oil, which contains or naturally possesses aromatic compounds. Alternatively, from catalytic cracking unit 10 an effluent of light cycle oil may flow containing at least 75% by weight of aromatic compounds, and a water source may be coupled with the effluent or hydrocarbon stream 100 such that the emulsion is greater than 75% water by volume. Water source 102 may be coupled to the hydrocarbon stream to mix water with hydrocarbon stream 100, which may be light cycle oil, and furthermore blend with a chemical emulsifying agent 101 to form an emulsion stream that may then be directed to mixer 104 for mixing. The mixed and untreated emulsion 106 may flow and subsequently undergo exposing an electron beam from electron beam unit 108 disposed or positioned to treat untreated emulsion 106 by radiolysis of the water into intermediates that react with and open rings of the aromatic compounds in untreated emulsion 106. Separator 112 may be coupled to receive the treated emulsion 110 output from electron beam unit 108 and remove or separate the water from a diesel range product stream. Water 102 separated by separator 112 may be directed upstream of mixer 104 for re-entry into mixer 104.

Hydroprocessing unit 118 may be located downstream of separator 112 to receive intermediate oxygenated stream 114 and remove oxygenates from the diesel range product stream (e.g. intermediate oxygenated stream 114) so that after passing through hydroprocessing unit 118, a reduced aromatic diesel fuel product results. Before intermediate oxygenated stream 114 enters hydroprocessing unit 118, hydrogen from a hydrogen stream 116 may be added to intermediate oxygenated stream 114 to form a combined stream that is fed into hydroprocessing unit 118.

The discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
   adding water to a hydrocarbon stream to form an emulsion, wherein aromatic compounds make up at least 50% by weight of the hydrocarbon stream and the emulsion is greater than 75% water by volume;
   treating the emulsion with an electron beam causing radiolysis of the water into intermediates that react with and open rings of the aromatic compounds;
   separating the water from the emulsion after the treating with the electron beam to provide a diesel range product; and
   blending the diesel range product having a higher cetane number than the hydrocarbon stream into a diesel fuel pool.

2. The method of claim 1, wherein the hydrocarbon stream is output from a catalytic cracking unit.

3. The method of claim 1, wherein the hydrocarbon stream is light cycle oil recovered from fluid catalytic cracking.

4. The method of claim 1, wherein less than 5% by weight of the hydrocarbon stream is cracked during the treating with the electron beam.

5. The method of claim 1, further comprising hydroprocessing the diesel range product to remove oxygenates.

6. The method of claim 1, wherein the aromatic compounds make up at least 75% by weight of the hydrocarbon stream.

7. The method of claim 1, wherein the aromatic compounds make up at least 80% by weight of the hydrocarbon stream and paraffin, olefin and naphthenic compounds make up at least 15% by weight of the hydrocarbon stream.

8. The method of claim 1, wherein compounds with a carbon count between 10 and 25 make up at least 90% by weight of both the hydrocarbon stream and the diesel range product.

9. The method of claim 1, wherein the emulsion is at least 85% water by volume.

10. The method of claim 1, wherein the emulsion is at least 95% water by volume.

11. The method of claim 1, further comprising adding an emulsifying agent to the water and the hydrocarbon stream to facilitate forming the emulsion.

12. A method, comprising:
    passing an emulsion of water and light cycle oil from a catalytic cracking unit through an electron beam, wherein resulting reactions based on composition of the emulsion yield more ring opening of aromatic compounds than cracking of the light cycle oil in order to upgrade cetane number of the light cycle oil for diesel blending.

13. The method of claim 12, wherein the emulsion is greater than 75% water by volume.

* * * * *